July 17, 1923.
T. A. GROSS
1,462,335
APPARATUS FOR TREATING GASOLINE
Filed July 14, 1920
2 Sheets-Sheet 2
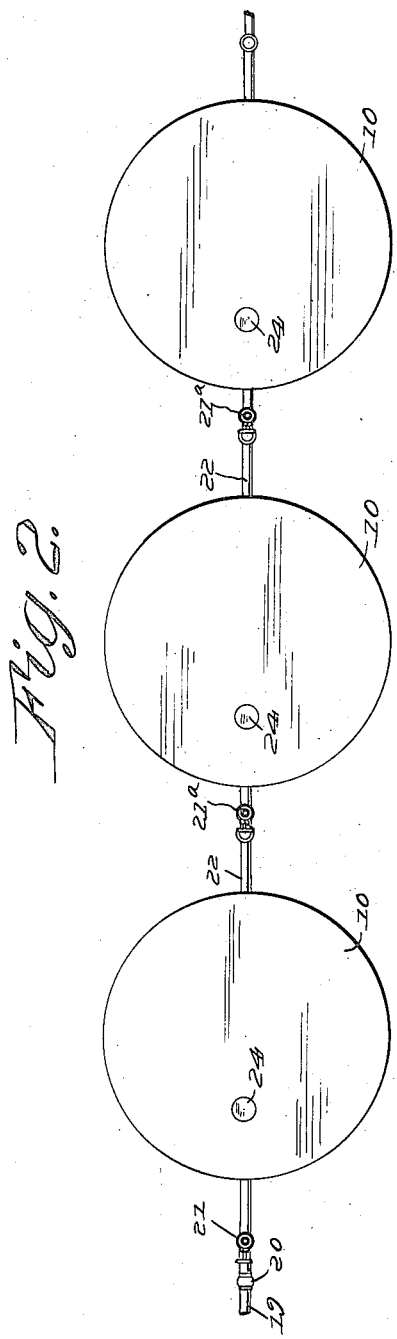
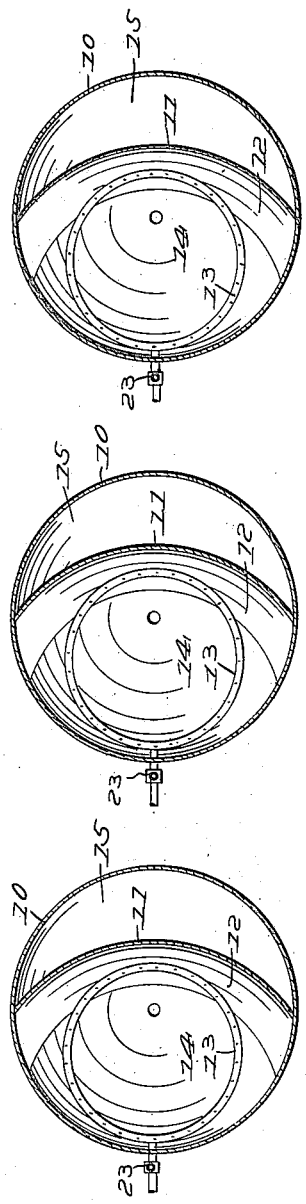

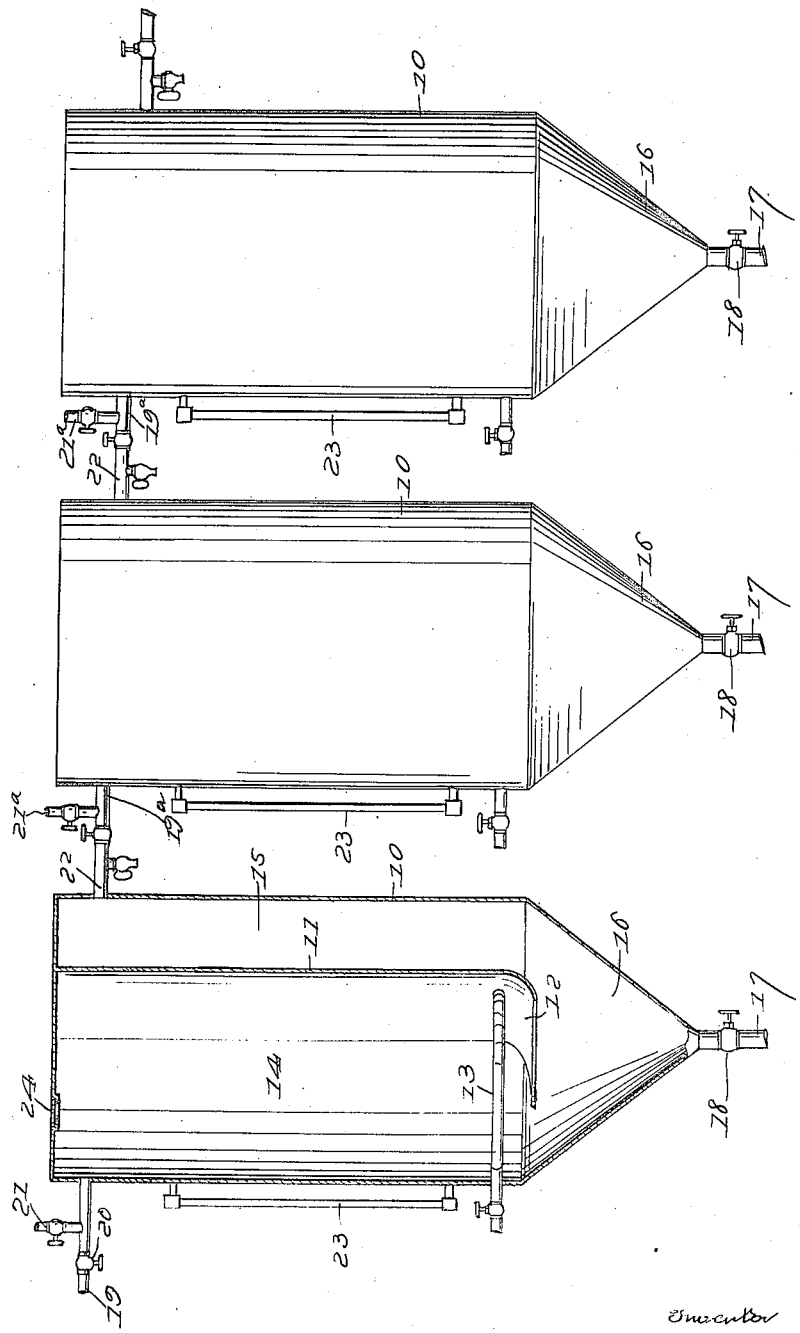

Patented July 17, 1923.

1,462,335

UNITED STATES PATENT OFFICE.

THOMAS A. GROSS, OF FREDERICK, OKLAHOMA.

APPARATUS FOR TREATING GASOLINE.

Application filed July 14, 1920. Serial No. 396,303.

*To all whom it may concern:*

Be it known that I, THOMAS A. GROSS, a citizen of the United States of America, residing at Frederick, in the county of Tillman and State of Oklahoma, have invented new and useful Improvements in Apparatus for Treating Gasoline, of which the following is a specification.

The object of the invention is to provide means for the continuous treatment of gasoline, kerosene and like oils for the purpose of cleansing and removing impurities therefrom immediately upon discharge from the condenser of the refinery, the said means making unnecessary the use of the present costly agitator, and with this object in view, the invention consists in a construction of combination of parts, of which the preferred embodiment is shown in the accompanying drawings, wherein, Figure 1, is a side view partly in section of an apparatus embodying the invention.

Figure 2, is a plan view.

Figure 3 is a horizontal sectional view.

The principle of operation of the device contemplates the passing of the gasoline or other like fluid to be cleansed through a washing or cleansing agent in opposition to the tendency of movement due to the relative specific gravity of the liquid to be cleansed and the liquid forming the cleansing agent and then liberating the liquid of less specific gravity. In carrying out this process there is employed a series of units which may be arranged to operate consecutively upon the liquid to be cleansed, any number of such units being arranged in series and each consisting essentially of a cylindrical receptacle 10 within which is arranged a partition 11 terminating short of the bottom of the receptacle in a baffle 12 above which is arranged a perforated coil 13 for the introduction of air designed to pass through the liquid in the main compartment 14 and thus agitate the same while leaving the liquid in the auxiliary compartment 15 undisturbed. The bottom of the receptacle preferably constitutes a funnel 16 with which connects a draw-off pipe 17 fitted with a valve 18 so that liquid of relatively greater specific gravity together with dirt or other foreign matter may be removed without disturbing the contents of the body portion of the receptacle. In communication with the main compartment or chamber 14 of the receptacle is a feed pipe 19 for the gasoline, kerosene or other liquid to be cleansed, the same being fitted with a suitable controlling valve 20 and tapped into communication with the feed pipe is a supply pipe 21 for the introduction of a cleansing fluid so that the cleansing fluid and the liquid to be cleansed are introduced simultaneously to the main compartment or chamber of the receptacle and are exposed to the agitation due to the introduction of air through the perforated coil 13. The cleansing fluid or agency may consist of water or the like adapted to remove impurities from the gasoline or other liquid to be cleansed. The latter will be introduced under pressure to the end that notwithstanding the relatively less specific gravity of the gasoline or liquid to be cleansed than that of the cleansing liquid, the former will pass downward due to the agitation of the contents of the main compartment chamber and will find its way into the supplemental chamber or compartment 15 and will thus be separated from the heavier liquid leaving the latter which may in turn be removed therefrom in the funnel 16 for withdrawal by way of the draw-off pipe 17. In communication with the gasoline or outlet compartment is a passage or tube 22 which may as shown in the drawing, connect with the feed passage or tube 19$^a$ of the next unit of the apparatus, a supply of the cleansing fluid being admitted thereto as above described through the pipe 21$^a$.

The outlet tube 22, it will be observed, is disposed at a slightly lower level than the inlet 19, but this outlet constitutes the inlet for the next succeeding unit and so on throughout the series. Thus the liquid being cleansed is transferred from one unit to the other with facility due to this variation in height between the inlet and outlet.

A water glass or gauge 23 is preferably arranged in connection with the main or inlet chamber or compartment 14 of the receptacle to enable the operator to determine the level of the contents thereof.

As above indicated a plurality of units may be employed in continuous series connected as above indicated to permit of the passage of the gasoline or other liquid to be cleansed from one to the other successively, said liquid being subjected to the same treatment or to an equivalent treatment in each unit until the removal of all foreign matter has been completed.

An inspection panel made of any suitable transparent material may be arranged as at 24 to permit a view of the interior of the main compartment or chamber to enable the operator to determine the violence of the agitation of the contents thereof.

The invention having been described, what is claimed as new and useful is:—

An apparatus for the treatment of gasoline and like liquids consisting of a plurality of units of which each consists of a cylindrical receptacle having a partition arranged therein and terminating short of the bottom and deflected laterally to provide a baffle, the partition dividing the receptacle into main and auxiliary compartments, a perforated coil adapted for connection to an air supply and disposed in the main compartment above said baffle, the receptacle being formed with a funnel shaped bottom by which communication between the two compartments is effected, a draw-off pipe at the apex of the funnel, an inlet disposed at the top of the main compartment, and an outlet means in the auxiliary compartment.

In testimony whereof he affixes his signature.

THOMAS A. GROSS.